United States Patent [19]

Ogino et al.

[11] Patent Number: 5,450,503
[45] Date of Patent: Sep. 12, 1995

[54] IMAGE RECOGNITION METHOD

[75] Inventors: Yasuo Ogino; Mitsutoshi Ohwada, both of Yokohama; Minoru Yoshii, Tokyo; Yukichi Niwa, Narashino, all of Japan

[73] Assignee: Canon Kabushiki Kaisha, Tokyo, Japan

[21] Appl. No.: 231,783

[22] Filed: Apr. 25, 1994

Related U.S. Application Data

[63] Continuation of Ser. No. 850,157, Mar. 13, 1992, abandoned, which is a continuation of Ser. No. 474,302, Feb. 5, 1990, abandoned, which is a continuation of Ser. No. 180,617, Apr. 4, 1988, abandoned, which is a continuation of Ser. No. 880,152, Jun. 30, 1986, abandoned.

[30] Foreign Application Priority Data

Jul. 4, 1985 [JP] Japan ............... 60-148113

[51] Int. Cl.[6] ............... G06K 9/46
[52] U.S. Cl. ............... 382/103; 382/194; 348/155; 348/169
[58] Field of Search ............... 382/18, 44, 45, 41, 382/51, 19, 1; 348/208, 143, 152-155, 169, 170; 250/578

[56] References Cited

U.S. PATENT DOCUMENTS

| | | | |
|---|---|---|---|
| 3,732,366 | 5/1973 | Bolie | 358/105 |
| 3,829,614 | 8/1974 | Ahlbom et al. | 358/126 |
| 3,836,710 | 9/1974 | Takahashi | 358/105 |
| 3,845,466 | 10/1974 | Hong | 382/18 |
| 4,164,728 | 8/1979 | Marsh | 382/18 |
| 4,219,847 | 8/1980 | Pinkney | 358/126 |
| 4,249,207 | 2/1981 | Harman et al. | 358/105 |
| 4,257,063 | 3/1981 | Loughry | 358/105 |
| 4,270,143 | 5/1981 | Morris | 358/105 |
| 4,398,177 | 8/1983 | Bernhardt | 382/18 |
| 4,403,256 | 9/1983 | Green et al. | 358/222 |
| 4,405,940 | 9/1983 | Woolfson et al. | 358/105 |
| 4,482,970 | 11/1984 | Barry | 358/105 |
| 4,490,851 | 12/1984 | Gerhart | 382/18 |
| 4,497,066 | 1/1985 | Gasparri | 382/48 |
| 4,570,181 | 2/1986 | Yamamura | 382/48 |
| 4,639,774 | 1/1987 | Fried | 358/105 |
| 4,688,088 | 8/1987 | Hamazaki et al. | 382/18 |
| 4,786,820 | 11/1988 | Ogino et al. | 250/578 |

FOREIGN PATENT DOCUMENTS

59-200379 11/1984 Japan ............... 382/18

Primary Examiner—Joseph Mancuso
Attorney, Agent, or Firm—Fitzpatrick, Cella, Harper & Scinto

[57] ABSTRACT

An image recognition method is conducted by extracting characteristic points of the pattern of an image formed by video signals from an image pickup device, within the whole or a limited area of a frame of a display, and measuring the distribution of the characteristic points of the image pattern. With this method, images can be recognized with minimal image processing time and with reduced influence of noises.

35 Claims, 5 Drawing Sheets

| X/Y | t1 | t2 | |
|---|---|---|---|
| $X_1$ | $P_1$ | $P_1'$ | $=P_1$ |
| ⋮ | ⋮ | ⋮ | |
| $X_n$ | $P_n$ | $P_n'$ | $=P_{n-1}$ |
| $Y_1$ | $Q_1$ | $Q_1'$ | |
| ⋮ | ⋮ | ⋮ | |
| $Y_n$ | $Q_n$ | $Q_n'$ | |

FIG. 6

IMAGE RECOGNITION METHOD

This application is a continuation of application Ser. No. 07/850,157 filed Mar. 13, 1992, which in turn is a continuation of application Ser. No. 07/474,302 filed Feb. 5, 1990, which in turn is a continuation of application Ser. No. 07/180,617, filed Apr. 4, 1988, which in turn is a continuation of application Ser. No. 06/880,152, filed Jun. 30, 1986, all now abandoned.

BACKGROUND OF THE INVENTION

1. Field of the Invention

The present invention relates to a method of recognizing images.

2. Description of the Prior Art

An image recognition method for use in, for example, image chasing device has been known in which an image is recognized through detection of the maximum amplitude points of a video signal from an image pickup device or a point where the curve representing the amplitude of the video signal crosses a predetermined threshold value. This known method, however, is disadvantageous in that the image recognition tends to be disturbed by image noises, often resulting in an erroneous operation of the device which makes use of this recognition method.

In another known method, a pattern is recognized through determination of the barycentre of the brightness in a predetermined area, while still another known method employs a reference image which is stored in a memory so that the image is recognized through detection of a point where the correlation coefficient between the image outputted from the image pickup device and the reference image is maximized. These methods, however, necessitate too many pieces of information and long processing time, as well as a highly complicated construction of the system.

SUMMARY OF THE INVENTION

Accordingly, an object of the invention is to provide an image recognition method which enables a correct image recognition without suffering from the problems of the prior art.

Another object of the invention is to provide an image recognition method which enables a correct image recognition with fewer number of pieces of information than in the known methods.

Still another object of the invention is to provide an image recognition method which enables a quick recognition of an image.

A further object of the invention is to provide an image recognition method which facilitates the construction of an image recognition apparatus.

A still further object of the invention is to improve a known image recognition method for recognizing an image within a limited region of the picture frame in an image pickup device such as a camera and an image scanner.

A still further object of the invention is to provide an improved image recognition method which enables compensation for any unintentional movement of the picked-up image.

To these ends, according to one aspect of the invention, there is provided an image recognition method comprising the steps of detecting the characteristic points of an image and producing signals corresponding to the concentration of the detected characteristic points in predetermined reference locations.

According to another aspect of the invention there is provided apparatus for image recognition comprising means for detecting the characteristic points of an image and means for producing signals corresponding to the concentration of the detected characteristic points in predetermined reference locations.

As used herein, the term 'characteristic point' means a location on a detectable image which is different, in respect of a given measurable feature, from an adjoining location. The difference may be, for example, color or brightness.

The above and other objects, features and advantages of the invention will become clear from the following description of the preferred embodiments taken in conjunction with the accompanying drawings.

BRIEF DESCRIPTION OF THE INVENTION

FIG. 4a is a schematic illustration of a screen for explaining the method of the invention;

FIGS. 4b and 4c are illustrations of distributions of numbers of image characteristic points formed on the screen of FIG. 4a;

DESCRIPTION OF THE PREFERRED EMBODIMENTS

Figure 1:
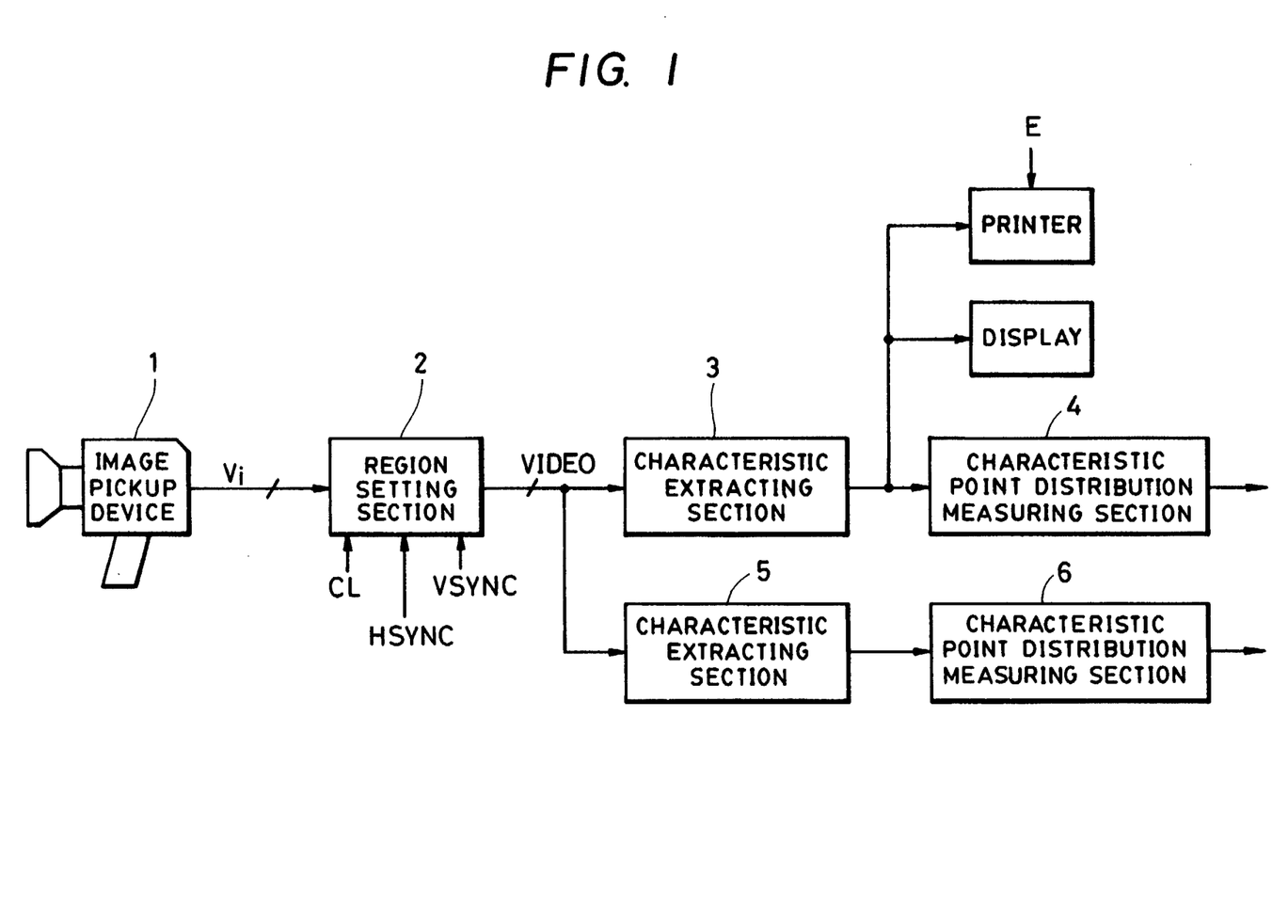
FIG. 1 is a simplified block diagram of a system for carrying out the method of the invention.

FIG. 1 shows a system which is suitable for use in carrying out the image recognition method of the invention. The system of FIG. 1 includes an image pickup device 1, a region setting section 2 for setting a region of a predetermined size in the picture frame which is formed by video signals derived from the image pickup device 1, characteristic point extracting sections 3 and 5 which extract characteristic points from an image, upon receipt of a video signal corresponding to the region of the size set in the region setting section 2, and measuring sections 4 and 6 for measuring the distributions of numbers of characteristic points outputted from the characteristic point extracting sections 3 and 5.

The image pickup device 1 may be a video camera or any other well known device, for example a CCD (charge coupled device) for converting an optical image into a group of electrical signals which are organized by means of horizontal and vertical synchronizing signals. The details of the region setting section 2, the characteristic point extracting sections 3 and 5 and the measuring sections 4 and 6 are described hereinbelow.

Figures 4A, 4B, 4C:
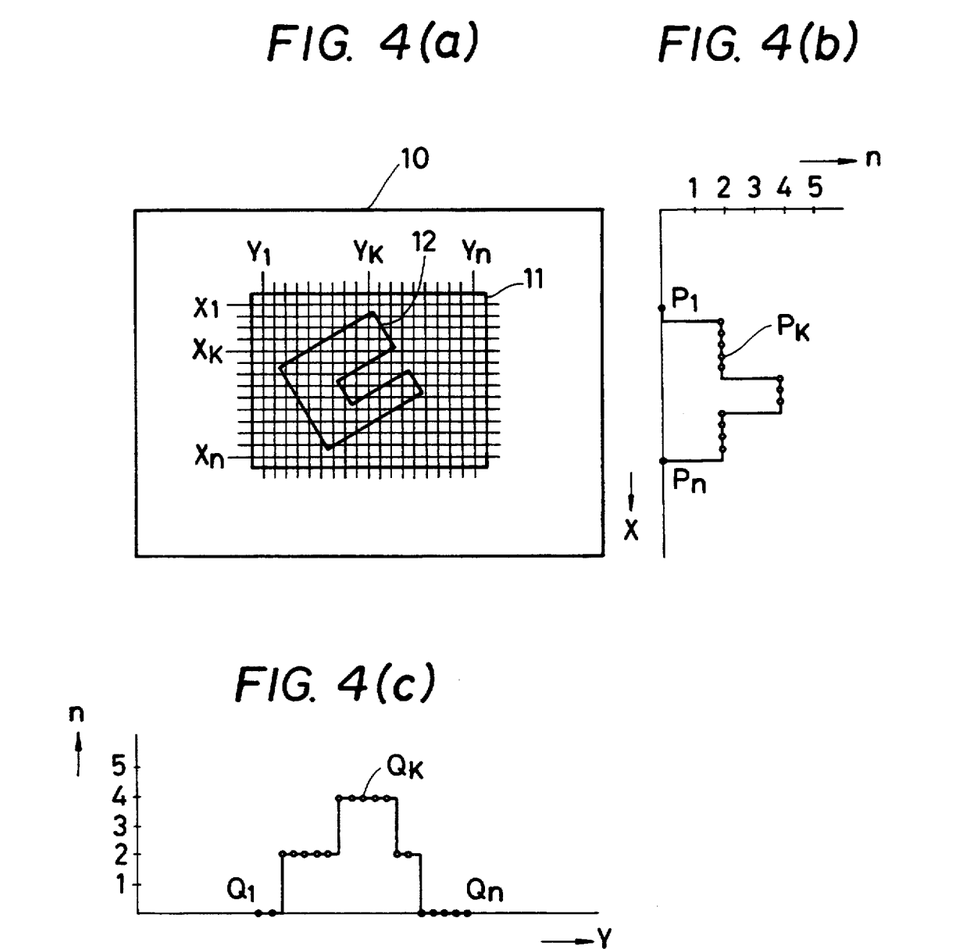

FIGS. 4a to 4c illustrate the principle of image recognition in accordance with the invention. A picture frame 10 is formed by a video signal Vi derived from the image pickup device 1. The region setting section 2 sets a region 11 of a predetermined size within the area of the picture frame 10. The pattern of an image 12 to be recognized is contained in the region 11. Horizontal lines $X_1 \ldots X_n$ represented by a line $X_k$, on the picture frame 10 are reference lines which are used as references for measurement of the distribution of the characteristic points by the distribution measuring section 4. Similarly, vertical lines $Y_1 \ldots Y_n$ represented by $Y_k$ on the picture frame 10 are reference lines which are used as references for measurement of the distribution of numbers of the characteristic points by the distribution measuring section 56. FIG. 4b is a graph which shows the distribution in the vertical direction (indicated by arrow X) of the numbers n of characteristic points found on respective horizontal reference lines $X_1 \ldots X_n$. Similarly, FIG. 4c shows the distribution in the horizontal direction (indicated by Y direction) of the numbers n of characteristic points found on respective vertical reference lines $Y_1 \ldots Y_n$. For instance, in FIG. 4b, a dot $P_k$ shows the number of characteristic points of the image 12 found along the horizontal reference line $X_k$, whereas a dot $Q_k$ shows the number of the characteristic points of the image 12 found on the vertical reference line $Y_k$.

As stated before, the region setting section 2 sets the image recognition region 11 of a predetermined size within the picture frame 10. For instance, counting of the number of the horizontal synchronizing signals HSYNC (not shown) contained by the video signal $V_i$ derived from the image pickup device 1 is commenced in synchronism with the vertical synchronizing signal VSYNC which determines the upper side $X_1$ and the lower side $X_n$ of the image starting or original point of the picture frame, whereby recognition region 11 are determined. On the other hand, the horizontal scanning direction is divided into predetermined time intervals, in accordance with reference clock signals CLK which are synchronous with the horizontal synchronizing signal HSYNC. The number of the clock signals CLK is counted so as to determine the right side $Y_1$ and the left side $Y_n$ of the image recognition region 11.

In this embodiment, the region setting section 2 passes only the video signals which correspond to the image recognition region 11.

Figure 2:
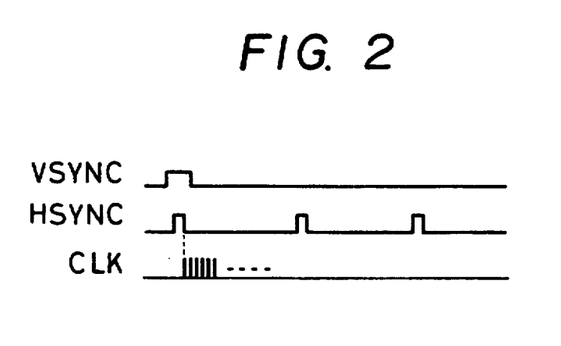
FIG. 2 is a timing chart illustrating the timing of horizontal and vertical synchronizing signals used in the system of FIG. 1.
Figure 3:
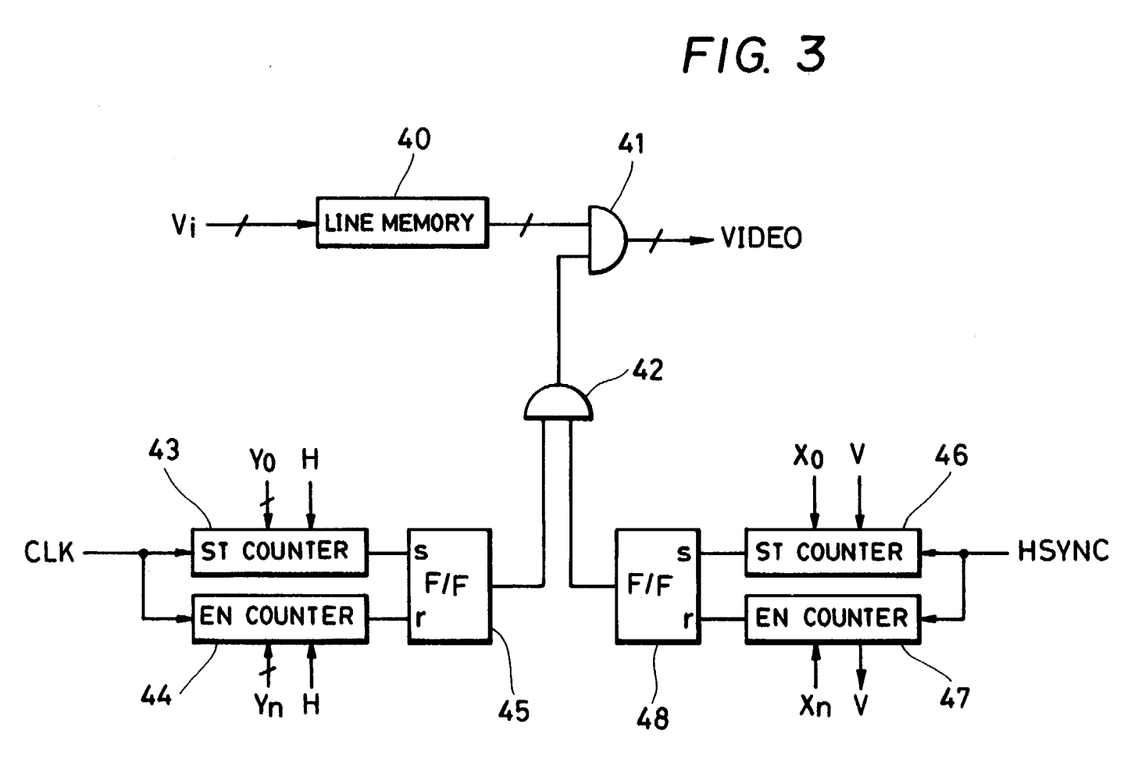
FIG. 3 is a block diagram of a region setting section in the system of FIG. 1.

FIG. 3 shows the detail of the region setting section 2, while FIG. 2 is a time chart showing the timing of the signals CLK, VSYNC and HSYNC.

Referring to FIG. 3, a line memory 40 stores a series of the video signals $V_i$ of 8-bit gradation corresponding to one line. For instance, the line memory 40 stores data corresponding to one line in Y-direction obtained by a read line sensor such as a CCD in the image pickup device 1 (FIG. 1). An AND gate 41 (FIG. 3) operates to transmit only the data corresponding to the image recognition region 11 (FIG. 4a) and outputs the same as video signals VIDEO to the characteristic point extracting sections 3 and 5 (FIG. 1). An AND gate 42 (FIG. 3) which controls the state of the AND gate 41 in response to control signals which are formed by a start bit counter 43, an end bit counter 44, a start line counter 46 and an end line counter 47. Addresses $Y_1$ and $Y_n$ of the region boundaries in the Y-direction (see FIG. 4a) are set in the counters 43 and 44. Upon counting $Y_1$ consecutive clock signals CLK, the counters 43 and 44 set a flip-flop 45 so as to deliver to the gate 42 a control signal thereby enabling the gate 41 to output the video signal VIDEO. Thereafter, upon counting $Y_n$ consecutive clock signals, the counters 43 and 44 reset the flip-flop 45, thereby terminating delivery of of the region boundaries $X_1 \ldots X_n$ in the X-direction have the control signal. If, on the other hand, the addresses been set in the counters 46 and 47, these counters operate to set a flip-flop 48 upon counting the horizontal synchronizing signal HSYNC up to $X_1$ and resets the same upon counting the horizontal synchronizing signal HSYNC up to $X_n$. In consequence, these counters deliver the control signal only in the period corresponding to the region between $X_1$ and $X_n$. It will be seen that the gate 41 transmits only the data corresponding to the region defined by the horizontal lines $X_1 \ldots X_n$ and the vertical lines $Y_1 \ldots Y_n$. The coordinate values $X_1 \ldots X_n$ and $Y_1 \ldots Y_n$ are designated by a digitizer or a ten-key input device and are stored in a memory 49. The counters 43 and 44 are reset by the horizontal synchronizing signals HYSNC, while the counters 46 and 47 are reset by the vertical synchronizing signals VSYNC.

The characteristic point extracting portions 3 and 5 extract characteristic points of the pattern of the image 12 within the image recognition region 11 (FIG. 4a). By way of example, a description will be made hereinafter as to a method in which the edge of the image, as detected by its contrast, is extracted as the characteristic point.

Figure 5:
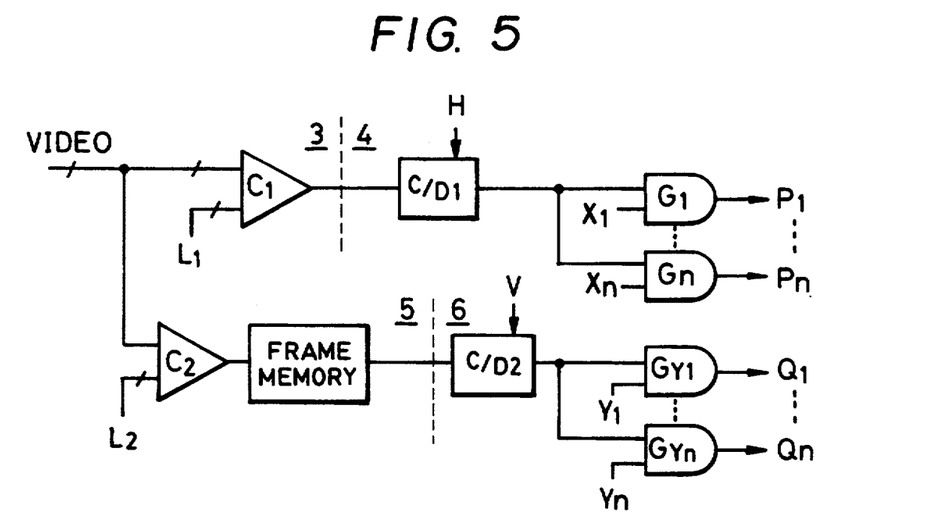
FIG. 5 is a circuit diagram of a characteristic point extracting section and a characteristic point measuring section in the system of FIG. 1.

As shown in FIG. 5, each of the characteristic point extracting sections 3 and 5 has a comparator $C_1$ and $C_2$, which effects amplifude discrimination of the video signal VIDEO according to a predetermined binarizing level $L_1$ and $L_2$, whereby the contrast between the pattern of the image 12 and the background is detected; and as a result, a binarized image is formed. Each of the characteristic point extracting sections 3 and 5 produces pulses corresponding to the rise and fall of the binarized image, i.e., the characteristic points of the pattern of the image 12 (FIG. 4a), and delivers the pulses to the corresponding distribution measuring section 4 or 6 which measures the distribution of the numbers of the characteristic points. The characteristic point extracting section 5 operates to temporarily store the binarized image data in a frame memory and, thereafter, reads the image data along each of the successive vertical lines $Y_1 \ldots Y_n$ in the direction towards the line $X_n$, and delivers the thus obtained data in the form of pulses to the measuring section 6.

Pieces of data binarized by the comparator $C_2$ are successively written in the frame memory in response to the horizontal scanning. As a result, the binarized data of the area 11 shown in FIG. 4a, i.e., the edge pattern, is stored. After the completion of the storage, a reading operation is conducted by scanning the frame memory in a sequence of the addresses corresponding to the vertical lines $Y_1$ to $Y_n$ shown in FIG. 4a. The data obtained through the reading scanning is sent to the counter 6 which is adapted to count the number of the data "1" which corresponds to the edge.

The distribution measuring section 4 for measuring the distribution of the numbers of the characteristic points has a counter/decoder C/D1 which counts the number of the characteristic points of the pattern of the image 12 counted on each of the successive reference lines $X_1 \ldots X_n$ in the image recognition region 11 (FIG. 4a) which is scanned with a predetermined resolution, and measures the distribution of the numbers of the characteristic points along the horizontal line represented by $Y_k$. Namely, the measuring section 4 produces signals $P_1$, $P_2$, and so forth which bear data concerning the numbers of the characteristic points found on respective horizontal reference lines $X_1 \ldots X_n$.

Figure 7:
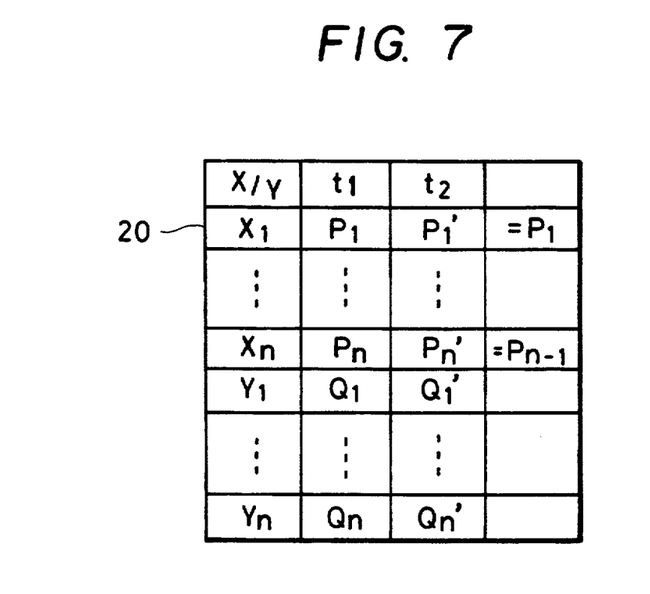
FIG. 7 is a table showing the content of a memory which stores distribution of numbers of the characteristic points.

When the image is a line image which has a high contrast against the background, the binarized image produced by the characteristic point extracting section 3 is equivalent to the pattern of the image 12. Therefore, the number of the pulses outputted from the characteristic point extracting section 3, corresponding to the characteristic points of the pattern of the image 12, is represented by the number of points where the pattern of the image 12 crosses the reference line $X_1$. Thus, the distribution measuring section 4 first measures the number of the points where the pattern of the image 12 is crossed by the first reference line $X_1$. Since the number of the crossing points is zero in this case, the measuring section 4 produces a signal representing a point $P_1$ as illustrated in FIG. 4b, and then conducts similar measurement for each of the successive lines $X_1 \ldots X_n$. For instance, the number of crossing points between the reference line $X_k$ and the pattern of the image 12, which is in this case 2 (two), is plotted as $P_k$, as shown in FIG. 4b. The measurement is then conducted for successive lines, whereby, as will be explained, a series of data $P_1 \ldots P_n$ are stored in a memory 20 in relation to the positions of the lines $X_1 \ldots X_n$, in an arrangement as shown in FIG. 7. The thus stored data can be used for a subsequent image processing or for the purpose of a display. The display shown in FIG. 1 can comprise a binarized image, as well as the binarized data $P_1 \ldots P_n$. The printer is capable of printing the binarized image.

The section 3 is the section which binarizes the image. A monotone printer (line printer) is adapted to be driven by the thus binarized data (1,0) so as to reproduce the line pattern, i.e., the edge pattern.

It will be seen that the image recognition can be conducted in real time, simultaneously with the pickup of the image, while displaying and printing the image.

Similarly, the measuring section 6 has a counter/decoder C/D2 which counts the number of the characteristic points of the pattern of the image 12 on each of the vertical reference lines $Y_1 \ldots Y_n$ in the image recognition region 11 which is scanned with a predetermined resolution, and measures the distribution of the numbers $Q_1 \ldots Q_n$ of the characteristic points along the vertical direction represented by the reference line $Y_k$, thus forming a distribution pattern as shown in FIG. 4c. The thus obtained data comprising the numbers $Q_1 \ldots Q_n$ of the characteristic points are stored in the memory 20 (FIG. 7), in relation to the positions of the vertical reference lines $Y_1 \ldots Y_n$.

The gates of the memory 20 are connected to a data processor (not shown) through respective BUS lines. The data processor operates in such a manner that the outputs from the gates obtained at the moment $t_1$ are stored as the data $P_1 \ldots Q_n$ in the address areas $X_1 \ldots Y_n$ of the memory corresponding to the gates. Similarly, the outputs obtained at the moment $t_2$ are stored as the data $P'_1 \ldots Q'_n$. After the storage of the groups of data obtained at the moments $t_1$ and $t_2$, the data processor reads from the address $X_1$ of the memory 20 the data $P_1$ and $P'_1$ which were obtained at the moments $t_1$ and $t_2$, and compares them with each other. The difference between this data is stored in the memory 20. It will be seen that the difference is zero, in case of the data read from the address $X_1$. Then, the data processor reads the data from the address $X_2$ of the memory at moments $t_1$ and $t_2$ and stores the result of the comparison between this data in the memory. This operation is continued down to the data from the address $Y_n$, and the state of movement of the image is judged from the data in the memory obtained as the result of comparison between corresponding data obtained at the moments $t_1$ and $t_2$.

Referring to FIG. 5, the distribution measuring sections 4 and 6 have gates $G_1 \ldots G_n$ and $G_{y1} \ldots G_{y2}$ which are adapted for outputting the count data for each of the data $P_1 \ldots P_n$ and $Q_1 \ldots Q_n$, thereby to distribute the data for respective lines $X_1 \ldots X_n$ and $Y_1 \ldots Y_n$.

The input signals $X_1 \ldots X_n$ inputted to the gates can be obtained by using a counter (not shown) the content of which is incremented for each of the successive horizontal lines during the horizontal scanning. Similarly, the input signals $Y_1 \ldots Y_n$ are obtained by a counter (not shown) which is incremented for each of the successive vertical lines $Y_1 \ldots Y_n$ during the vertical scanning. In the arrangement shown in FIG. 5, the accuracy of the image recognition is enhanced because the video signal VIDEO is first binarized by the comparator $C_2$ and then stored in the frame memory. The pitch of scanning along the lines $Y_1 \ldots Y_n$ may be greater than that of the scanning along the lines $X_1 \ldots X_n$.

The signals $X_1 \ldots X_n$ and the signals $Y_1 \ldots Y_n$ are derived from different terminals of a decoder which produce an output each time of counting by a first counter and a second counter which are not shown. More specifically, when the horizontal scanning at the address $X_1$ is finished, the content of the first counter is incremented by "1" and the signal $X_1$ is outputted from an $X_1$ terminal of the decoder. Then, when the horizontal scanning at the address $X_2$ is finished, the content of the first counter is further incremented by "1" and the signal $X_2$ is outputted from the decoder. Similarly, when the vertical scanning at the address $Y_1$ is finished, the content of the second counter is incremented by "1", and the signal $Y_1$ is outputted from the $Y_1$ terminal of the decoder. Then, when the vertical scanning at the address $Y_2$ is finished, the content of the second counter is further incremented by "1" and the signal $Y_2$ is outputted from-the decoder.

The signals $Y_1 \ldots Y_n$, which correspond to addresses $Y_1 \ldots Y_n$ shown in FIG. 4a, are produced each time a reading scanning corresponding to the vertical scanning of the image is finished during reading of the content of the frame memory.

The distribution data $P_1 \ldots P_n$ and $Q_1 \ldots Q_n$ concerning the distribution of the numbers of the characteristic patterns can be obtained in the manner described hereinbefore.

The thus obtained data can be used for various purposes. For instance, it is possible to detect the direction and distance of movement of the image 12 within the picture frame 10. To this end, the characteristic points are extracted at a first moment $t_1$ in the above-described manner; and, at a second moment $t_2$, a new image recognition region 11 of the same size and shape as those of the first region is set within the area of the picture frame 10, and the distributions $P'_1 \ldots P'_n$ and $Q'_1 \ldots Q'_n$ of the characteristic points at the record moment $t_2$ are determined in the same manner as described above. Then, the direction and amount of movement of the image 12 within the picture frame 10 can be known by determining the correlation between two groups Of distribution data $P_1 \ldots P_n$, $Q_1 \ldots Q_n$ and $P'_1 \ldots P_n'$, $Q'_1 \ldots Q_n$. This method can be applied to the judgement of occurrence of any unintentional 10 movement of a camera during shooting. For instance, it is possible to produce a warning signal which indicates the unintentional movement of the camera and, hence, movement of the image pattern.

In a practical application, the video signal VIDEO is inputted to a correction filter circuit in response to the detection of the movement of the image, so as to remove the data of the pattern measured at the moment $t_2$, thereby recovering the image pattern as obtained at the moment $t_1$. Therefore, if the image is to be reproduced by the printer in the system shown in FIG. 1, the arrangement may be such that the printer is driven by an enable signal E when no movement of the image is confirmed or only after the image correction has been accomplished through elimination of the component attributable to the image movement.

For instance, referring to FIG. 7, if the value of the data $P'_1$ as measured at the moment $t_2$ is the same as the value of the corresponding data P1 measured at the moment $t_1$, while the values of the data $P'_2$ and $P'_n$ as measured at the moment $t_2$ are 0 (zero) and 2 (two), respectively, it is understood that the image has been moved translationally downward towards the line $X_n$ (see FIG. 4a) by a distance equal to one pitch of the horizontal reference lines $X_1 \ldots X_n$.

If the printer for reproducing the image is not a binary printer but a printer or a display which is capable of reproducing or displaying halftone, such a printer or display can directly receive the video signal VIDEO.

The characteristic point extracting sections 3 and 5 may be constituted by different systems which employ different extraction methods which will be mentioned later. If it is allowed to use the same extraction method for the extraction in both directions, it is possible to use a single extracting section instead of two independent extracting sections.

The image recognition region 11 may be as wide as the entire area of the frame 10. Also, the image extraction region 11 can have any desired shape such as a circular shape, although in the described embodiment the region 11 has a substantially rectangular form. The measurement of the distribution of numbers of the characteristic points may be made in at least one direction which may be inclined with respect to the frame, for example, as shown in FIG. 6; and it may be conducted along curved reference lines although the described embodiment makes use of linear reference lines.

Figure 6:
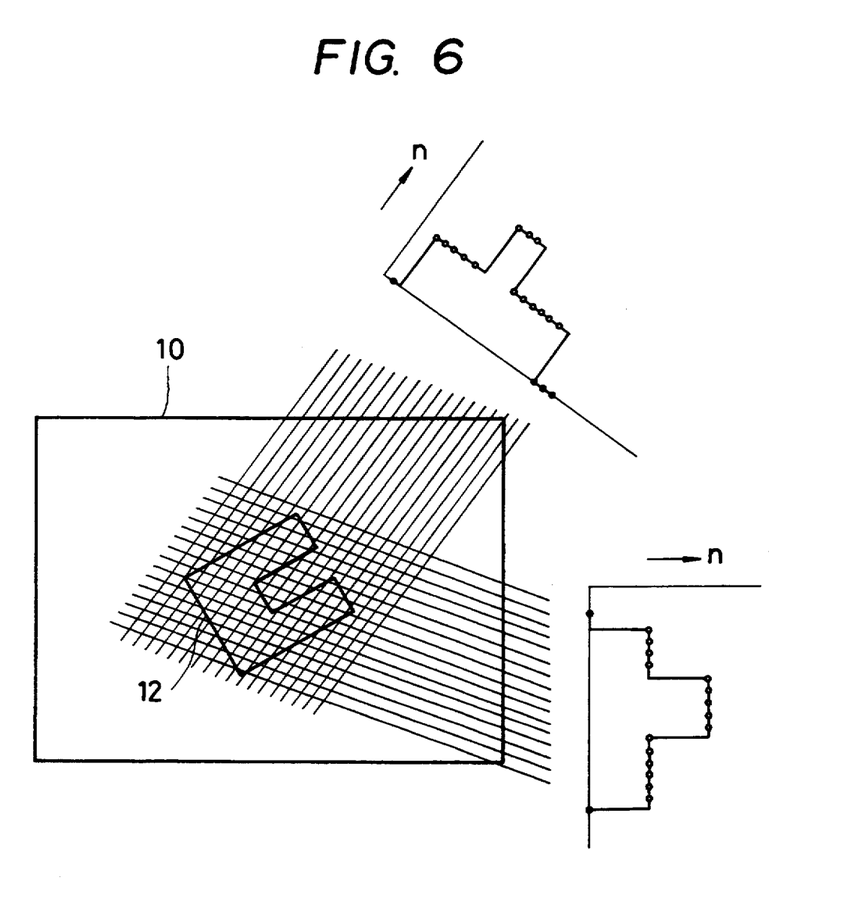
FIG. 6 is an illustration of a modification of the embodiment shown in FIGS. 4a, 4b and 4c.

More specifically, the arrangement shown in FIG. 6 employs a pair of frame memories: namely, a first frame memory and a second frame memory. The first frame memory stores the image data V'c. The pattern stored in this first frame memory is read after a rotation through an angle α, i.e., in terms of addresses which are obtained by rotation of the coordinate of the memory through the angle α, and the thus read data is stored in the second frame memory. Then, the data in the second frame memory is read in terms of the normal address, and the characteristic points are extracted in the same manner as that explained before in connection with FIG. 4 and other Figures.

The characteristic points which are to be extracted by the extracting sections 3 and 5 may be the contrast points such as the points where the video signals derived from the image pickup device cross a predetermined threshold level as in the described embodiment, or they may be a minimum or maximum value of the video signal. It is also possible to use a color difference as the basis for the characteristic points. The characteristic points may also be points which are obtained through a suitable processing of the video signal, such as the maximum or minimum values of a signal obtained through differentiation of the video signal, and a point at which the differentiated video signal reaches a predetermined threshold value.

What is claimed is:

1. A video camera apparatus having a device for correcting movement of an image formed on an image sensing plane, comprising:

image sensing means for sensing an image formed on an image sensing plane and generating image signals;

setting means for setting an area on said image sensing plane for image recognition, said area formed by said image signals from said image sensing means;

extracting means for automatically extracting an image signal in said area set by said setting means;

first detecting means for detecting a plurality of characteristic points of the image in the extracted image signal in a horizontal and vertical direction in said area on said image sensing plane and storing said characteristic points in a memory means as a two-dimensional image pattern of said image;

second detecting means for detecting a movement and a direction of movement of said image by comparing said stored image pattern with an image pattern obtained at a different time; and correcting means for electrically correcting a movement and a direction of movement of said image formed on said image sensing plane on the basis of the result of a comparing operation of said second detecting means by conducting a predetermined processing of said image signals.

2. An apparatus according to claim 1, wherein said setting means sets said area composed of image data in accordance with horizontal and vertical address data and a vertical synchronizing signal.

3. An apparatus according to claim 1, wherein said extracting means is adapted for extracting, as said image signal, valid data in accordance with a signal from said setting means.

4. An apparatus according to claim 1, further comprising binary-coding processing means for conducting binary-coding processing on said image signal extracted from said extracting means.

5. An apparatus according to claim 4, wherein said binary-coding processing circuit is adapted for detecting edges of said image signal from the binary-coded data, and for delivering a signal corresponding to said edges to said first detecting means.

6. An apparatus according to claim 5, wherein said first detecting means counts the number of said characteristic points on the basis of said edges of said image signal for each of a plurality of reference lines.

7. An apparatus according to claim 1, wherein said first detecting means includes a plurality of reference lines extending in a first direction and a plurality of reference lines extending in a second direction.

8. An apparatus according to claim 1, wherein said first detecting means comprises a counting means for counting the number of said characteristic points in the extracted image signal for each of a plurality of reference lines and said memory means stores the number of said characteristic points.

9. An apparatus according to claim 1, wherein said correcting means includes a correction filter circuit.

10. A video camera apparatus having a device for correcting movement of an image formed on an image sensing plane, comprising:

(A) image sensing means for sensing an image formed on an image sensing plane and for generating image signals;

(B) extracting means for automatically extracting image signals at a plurality of points distributed in a horizontal and vertical direction on said image sensing plane as a twodimensional image pattern corresponding to a characteristic of said image;

(C) memory means for storing said two-dimensional pattern;

(D) operating means for controlling a movement and a direction of movement of said image by comparing said stored image pattern with an image pattern obtained at a different time; and (E) correcting means for electrically correcting the movement of said image formed on said image sensing plane based on the result of the comparing operation of said operating means by conducting a predetermined processing on said image signals.

11. An apparatus according to claim 10, further comprising:
binary-coding processing means for conducting binary-coding processing on said image signal extracted from said extracting means; and
counting means for counting the number of said characteristic points in the extracted image signal for each of a plurality of reference lines and said memory means stores the number of said characteristic points.

12. An apparatus according to claim 11, wherein said binary-coding processing circuit is adapted for detecting edges of said image signal from the binary-coded data, and for delivering a signal corresponding to said edges to said counting means.

13. An apparatus according to claim 10, wherein said correcting means includes a correction filter circuit.

14. A video camera apparatus having a device for compensating movement of an image formed on an image sensing plane, comprising:
image sensing means for automatically sensing an image formed on an image sensing plane and generating image signals;
extracting means for extracting an image signal corresponding to an image in an area on said image sensing plane;
memory means;
first detecting means for detecting characteristic information in the extracted image signal and storing said characteristic information in said memory means as a characteristic of said image;
second detecting means for detecting a movement and a direction of movement of said image by comparing said stored information with characteristic information obtained at a different time; and
compensating means for electrically compensating the movement and the direction of movement of said image formed on said image sensing plane on the basis of the result of a comparing operation of said second detecting means by conducting a predetermined processing of said image signals.

15. An apparatus according to claim 14, wherein said first detecting means comprises a counting means for counting the number of characteristic points in the extracted image signal for each of a plurality of reference lines and said memory means stores the number of said characteristic points.

16. An apparatus according to claim 14, wherein said compensating means includes a compensation filter circuit.

17. An apparatus according to claim 14, wherein said first detecting means comprises:
binary-coding processing means for conducting binary-coding processing on said image signal extracted from said extracting means; and
counting means for counting the number of said characteristic points in the extracted image signal for each of a plurality of reference lines, and said memory means stores the number of said characteristic points.

18. An apparatus according to claim 17, wherein said binary-coding processing circuit is adapted for detecting edges of said image signal from the binary-coded data, and for delivering a signal corresponding to said edges to said counting means.

19. An apparatus according to claim 17, wherein said compensating means includes a compensation filter circuit.

20. An apparatus according to claim 14, further comprising display means for displaying the image signal output from said image sensing means on a monitor screen.

21. An apparatus according to claim 14, further comprising printer means for printing the image signal output from said image sensing means on a monitor screen.

22. A video camera apparatus having a device for compensating movement of an image formed on an image sensing plane, comprising:
image sensing means for sensing an image formed on an image sensing plane and for generating image signals;
extracting means for automatically extracting image signals at a plurality of points distributed in a horizontal and in a vertical direction on said image sensing plane as a two-dimensional pattern corresponding to a characteristic of said image;
memory means for storing said two-dimensional pattern;
operating means for controlling a movement and a direction of movement of said image by comparing said stored pattern with a pattern obtained by said extracting means at a different time; and
compensating means for electrically compensating the movement of said image formed on said image sensing plane based on the result of the comparing operation of said operating means by conducting a predetermined processing on said image signals.

23. An apparatus according to claim 22, wherein said extracting means extracts a plurality of edge information in the image signal as a two-dimensional pattern corresponding to the characteristic of said image.

24. An apparatus according to claim 23, wherein said operating means compares the two-dimensional pattern stored in said memory with a pattern extracted by said extracting means.

25. An apparatus according to claim 22, said compensating means further comprising a compensating filter means for electrically compensating for the movement of the image.

26. An apparatus according to claim 22, further comprising a display for displaying the image signal output from said image sensing means.

27. An apparatus according to claim 22, further comprising a printer for printing the image signal output from said image sensing means.

28. A video camera apparatus having a device for compensating movement of an image in an image frame, comprising:

image receiving means for receiving an image and outputting an image signal corresponding to said image;

extracting means for automatically extracting characteristic information from the image signal at a plurality of areas in said image frame as characteristic information of said image;

storing means for storing the characteristic information extracted by said extracting means;

movement detecting means for detecting a movement and direction of movement of said image by comparing said stored information with characteristic information obtained at a different time; and     compensating means for electrically compensating the movement and the direction of movement of said image in said image frame on the basis of a result of a comparing operation of said movement detecting means.

29. An apparatus according to claim 28, wherein said extracting means comprises counting means for counting a number of characteristic points in the extracted image signal for each of a plurality of reference lines and said memory means stores the number of said characteristic points.

30. An apparatus according to claim 28, wherein said compensating means includes a compensation filter circuit.

31. An apparatus according to claim 28, wherein said extracting means comprises:

binary-coding processing means for conducting binary-coding processing on said image signal output from said image receiving means; and     counting means for counting the number of characteristic points in said image signal for each of a plurality of reference lines, and said memory means stores the number of said characteristic points.

32. An apparatus according to claim 31, wherein said binary-coding processing circuit is adapted for detecting edges of said image signal from the binary-coded data, and for delivering a signal corresponding to said edges to said counting means.

33. An apparatus according to claim 31, wherein said compensating means includes a compensation filter circuit.

34. An apparatus according to claim 28, further comprising display means for displaying the image signal output from said image sensing means on a monitor screen.

35. An apparatus according to claim 28, further comprising printer means for printing the image signal output from said image sensing means on a monitor screen.

* * * * *

UNITED STATES PATENT AND TRADEMARK OFFICE
CERTIFICATE OF CORRECTION

PATENT NO. : 5,450,503
DATED : September 12, 1995
INVENTOR(S) : YASUO OGINO, et al.

It is certified that error appears in the above-indentified patent and that said Letters Patent is hereby corrected as shown below:

ON THE COVER PAGE

[57] ABSTRACT

Line 8, "noises." should read --noise.--.

COLUMN 2

Line 18, "INVENTION" should read --DRAWINGS--.

COLUMN 3

Line 11, "section 56." should read --section 6.--.
Line 16, "Y direction)" should read --arrow Y)--.
Line 31, "determines the" should read
--determines starting or original point of the picture frame, whereby the--.
Line 32, "starting or original point of" should be deleted.
Line 33, "the picture frame, whereby" should be deleted.
Line 68, "of of" should read --of the control signal. If, on the other hand, the addresses of--.

COLUMN 4

Line 1, "the control" should be deleted.
Line 2, "signal. If, on the other hand, the addresses" should be deleted.

UNITED STATES PATENT AND TRADEMARK OFFICE
CERTIFICATE OF CORRECTION

PATENT NO. : 5,450,503
DATED : September 12, 1995
INVENTOR(S) : YASUO OGINO, et al.

It is certified that error appears in the above-indentified patent and that said Letters Patent is hereby corrected as shown below:

COLUMN 6

Line 61, "Of" should read --of--.
Line 64, "10" should be deleted.

COLUMN 7

Line 15, "data P1" should read --data $P_1$--.

COLUMN 9

Line 7, "two dimensional" should read --two-dimensional--.

Signed and Sealed this

Nineteenth Day of March, 1996

Attest:

BRUCE LEHMAN

Attesting Officer

Commissioner of Patents and Trademarks